United States Patent
Le et al.

(10) Patent No.: US 6,654,876 B1
(45) Date of Patent: Nov. 25, 2003

(54) SYSTEM FOR REJECTING AND REISSUING INSTRUCTIONS AFTER A VARIABLE DELAY TIME PERIOD

(75) Inventors: Hung Qui Le, Austin, TX (US); David James Shippy, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/434,875

(22) Filed: Nov. 4, 1999

(51) Int. Cl.⁷ .............................. G06F 9/30; G06F 9/40
(52) U.S. Cl. ....................... 712/218; 712/214
(58) Field of Search ................... 712/217, 214, 712/215, 218

(56) References Cited

U.S. PATENT DOCUMENTS 5,555,432 A * 9/1996 Hinton et al. ............... 712/217
6,237,081 B1 * 5/2001 Le et al. ..................... 712/214

OTHER PUBLICATIONS

White, Ron, How Computers Work, 1994, Ziff–Davis Press, pp. 103 and 115–119.*
Hennessy, John L. and David A. Patterson, Computer Organization & Design The Hardware/Software Interface, 1998, Morgan Kaufmann Publishers, Inc., 2nd Ed., pp. 410–411 and 598–600.*

* cited by examiner

Primary Examiner—Richard L. Ellis
Assistant Examiner—Tonia L. Meonske
(74) Attorney, Agent, or Firm—Joseph P. Lally; Diana L. Roberts; Volel Emile (57) ABSTRACT

A method, processor, and data processing system implementing a delayed reject mechanism are disclosed. The processor includes an issue unit suitable for issuing an instruction in a first cycle and a load store unit (LSU). The LSU includes an extend reject calculator circuit configured to receive a set of completion information signals and generate a delay value based thereon. The LSU is adapted to determine whether to reject the instruction in a determination cycle. The number of cycles between the first cycle and the determination cycle is a function of the delay value such that reject timing is variable with respect to the first cycle. In one embodiment, the processor is further configured to reissue the instruction after the determination cycle if the instruction was rejected in the determination cycle. The delay value is conveyed via a 2-bit bus in one embodiment. The 2 bit bus permits delaying the determination cycle from 0 to 3 cycles after a finish cycle. In one embodiment, the number of cycles between the first cycle and the determination cycle includes the number of cycles required to travel a pipeline of the microprocessor plus the number of cycles indicated by the delay value.

15 Claims, 6 Drawing Sheets

SYSTEM FOR REJECTING AND REISSUING INSTRUCTIONS AFTER A VARIABLE DELAY TIME PERIOD

BACKGROUND

1. Field of the Present Invention

The present invention generally relates to the field of microprocessors and more particularly to a microprocessor architecture supporting a variable cycle instruction reject delay to improve processor performance.

2. History of Related Art

The speed of high performance superscalar microprocessors (processors), measured in terms of the frequency of the processor's clock signal, is rapidly migrating from the MHz range to the GHz range. As cycle times decrease with ever increasing clock rates, the number of levels of logic allowable in the design of any pipeline stage is extremely limited. These limited number of logic levels must be optimized to accomplish the most common tasks within the time limits imposed by the operating frequency. As an example, the pipeline of a processor's load/store unit (LSU) must be capable of successfully completing a load instruction in each cycle as long as the load instructions hit in the processor's L1 cache. Inevitably, however, less frequently occurring conditions cannot be resolved within the timing constraints imposed by the system. In a conventional processor, the determination of whether to reject an instruction is made when the instruction is in a final stage (the finish stage) of the pipeline. If, for any number of reasons, the functional unit in which the instruction is executing lacks sufficient information to determine that the instruction should be completed when the instruction reaches the finish stage, the instruction must be rejected. Thus, it will be appreciated that conventionally designed processors typically employ a fixed timing reject mechanism in which the reject decision is made a predetermined and non-varying number of cycles after the instruction issues.

Figure 3:
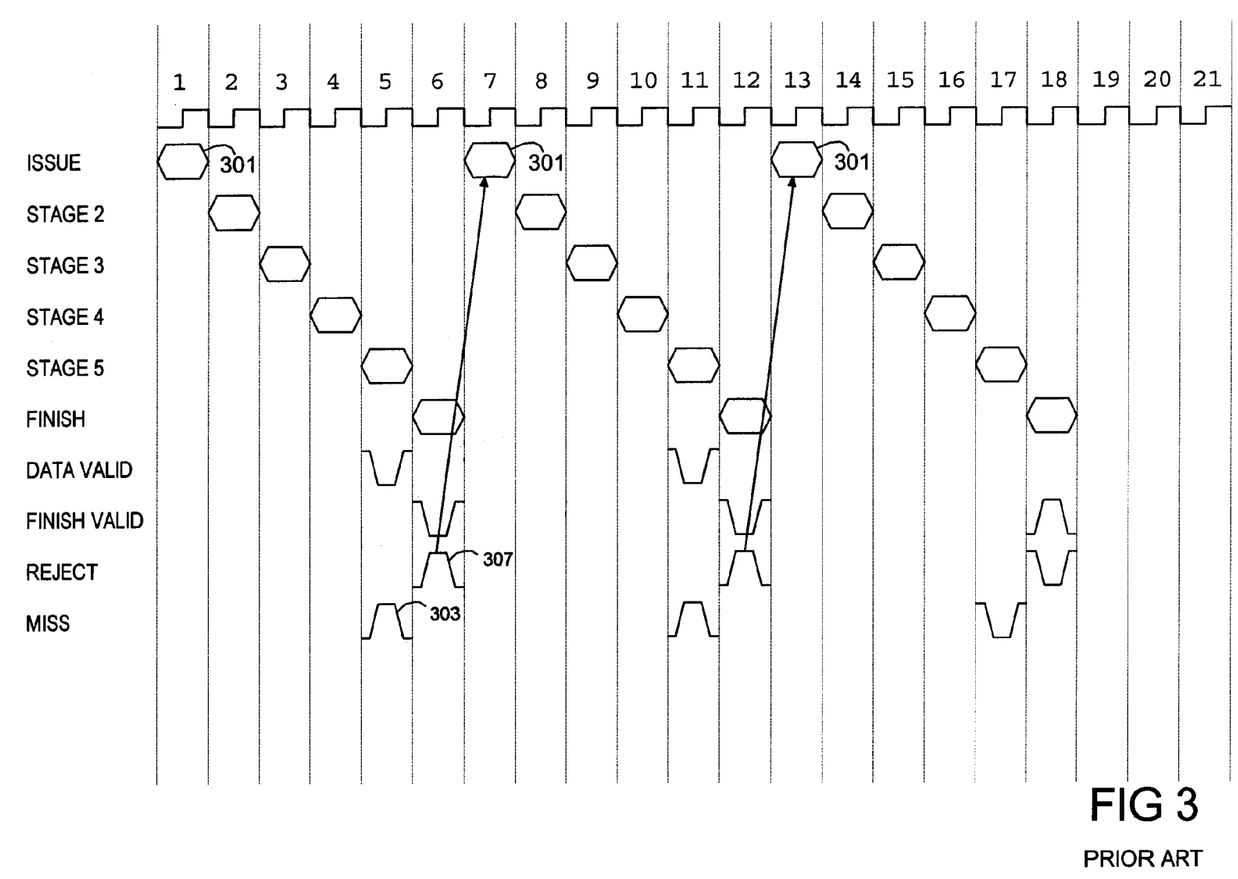
FIG. 3 is a timing diagram illustrating operation of a fixed timing reject mechanism according to the prior art.

Turning to FIG. 3, a timing diagram illustrating the operation of a fixed timing reject mechanism of a conventional processor is presented. In cycle 1 of the timing diagram, an instruction indicated by reference numeral 301 is issued and begins to flow through the pipeline. If the instruction contains a reference to a location in memory, the processor must initiate the process of determining whether valid data for the referenced memory address is available in the processor's L1 data cache. This process may include an address translation component, in which the address recited in the instruction (the effective address) is translated to an address corresponding to a physical memory location (the real address) and an L1 cache retrieval component, in which the address tags of the L1 cache are compared against the address of the memory reference and data returned form the L1 cache. In the depicted example, a miss signal 303 is asserted to indicate that the data retrieval process failed to complete successfully. The miss signal 303 may reflect a variety of conditions that caused the instruction not to complete successfully. In one case, as an example, miss signal 303 may indicate that the effective to real address translation (ERAT) process could not complete in the time it takes instruction 301 to propagate through the pipeline. When this occurs, the processor must initiate a relatively time consuming retrieval of address translation information. Because the address translation information is not available when instruction 301 arrives at the finish stage in cycle 6, a reject signal indicated in FIG. 3 by reference numeral 307 is asserted. In response to reject signal 307, the processor reissues instruction 301 in the next cycle (cycle 7) and the instruction begins to propagate through the pipeline again. If the number of cycles required to retrieve the address translation information initiated by miss signal 303 is greater than the depth of the pipeline (in stages), the address translation information will not be available when instruction 301 reaches the finish stage for a second time in cycle 12. Accordingly, the instruction is rejected in cycle 12 and reissued for a third time in cycle 13. When instruction 301 reaches the finish stage in cycle 18, the necessary translation information has had sufficient time to be retrieved and the instruction can complete successfully. Because a reject decision had to be made as soon as the instruction reached the finish stage of the pipeline, instruction 301 was rejected twice and was required to travel the LSU pipeline three times. More generally it can be said that the fixed timing reject mechanism of conventional processors forces an all-or-nothing decision when an instruction reaches the finish stage of a pipeline. If any information or resource necessary to complete the instruction is unavailable in the cycle that the instruction reaches the finish stage, the instruction is rejected. Moreover, whenever an instruction is rejected, completion of that instruction will be delayed by at least the number of stages in the pipeline. If a pipeline includes six stages, an instruction that is rejected in cycle X cannot complete until, at the earliest, cycle X+6. If the instruction is rejected again in cycle X+6, the next earliest cycle in which the instruction could complete would be cycle X+12 and so forth. In other words, one can think of the processor as having an "instruction period" or "instruction cycle" that is equal to the number of pipeline stages in the processor. In a conventional, fixed timing reject processor, the reject decision is made at the end of each instruction period. It will be appreciated, however, that in some cases, the information or resource that is lacking at the time an instruction reaches its decision point (i.e., the finish stage) may be available before the end of the next instruction period. In this case, performance is negatively impacted because the architecture inhibits completion of the result until the end of the next instruction period. As an example, consider a processor with a six cycle instruction period in which the retrieval of address translation information (when the information is not immediately available in an address translation cache) requires ten cycles and the retrieval process is not initiated until the fifth cycle of the instruction period, when the processor determines that the address translation information is not locally available (i.e., is not cached). If the retrieval of the address translation process is initiated in cycle 5, it will not be available until cycle 15, which falls in the middle of an instruction cycle. In this case, completion of the instruction is again delayed for the number of cycles between the time when all information is available to complete the instruction (cycle 15 in the example) and the end of the next instruction cycle (cycle 18). Therefore, it would be beneficial to implement an architecture that eliminated the performance penalty resulting from the constraint of requiring a reject decision in the cycle when an instruction reaches the finish stage.

SUMMARY OF THE INVENTION

The problems identified above are in large part address by a processor implementing a delayed reject mechanism. The processor includes an issue unit suitable for issuing an instruction in a first cycle and a load store unit. The load store unit includes an extend reject calculator circuit configured to receive a set of completion information signals and to generate a delay value based thereon. The LSU is adapted to determine whether to reject the instruction in a determination cycle. The number of cycles between the first cycle and the determination cycle is a function of the delay value such that reject timing is variable with respect to the first cycle. In one embodiment, the processor is further configured to reissue the instruction after the determination cycle if the instruction was rejected in the determination cycle. The delay value is conveyed via a 2-bit bus in one embodiment. The 2-bit bus permits delaying the determination cycle from 0 to 3 cycles after the finish cycle. In one embodiment, the number of cycles between the first cycle and the determination cycle includes the number of cycles required to travel a pipeline of the microprocessor plus the number of cycles indicated by the delay value.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED EMBODIMENT OF THE PRESENT INVENTION

Figure 1:
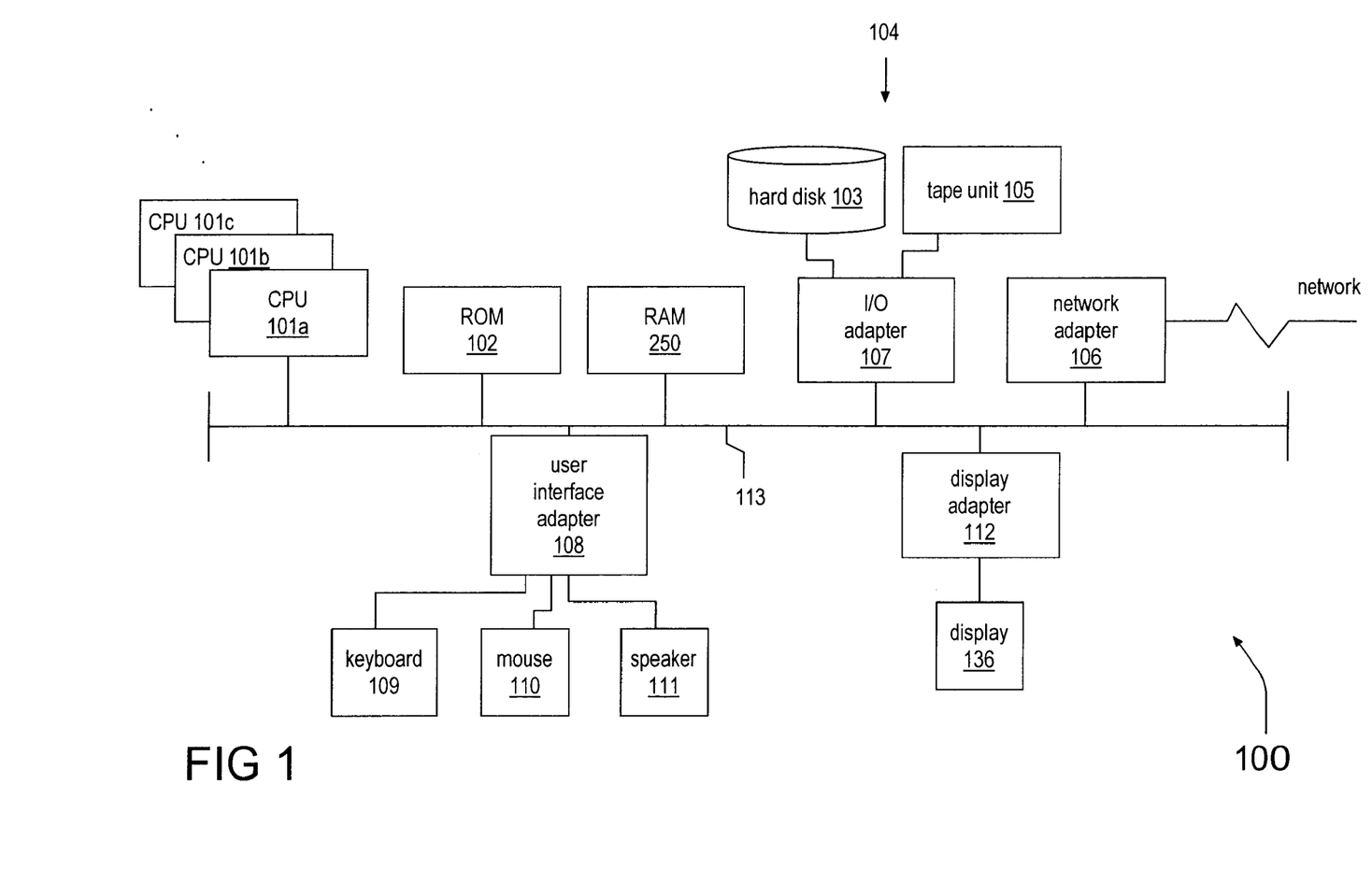
FIG. 1 is a simplified block diagram of a data processing system.

Referring now to FIG. 1, an embodiment of a data processing system 100 according to the present invention is depicted. System 100 has one or more central processing units (processors) 101a, 101b, 101c, etc. (collectively or generically referred to as processor(s) 101. In one embodiment, each processor 101 may comprise a reduced instruction set computer (RISC) microprocessor. Additional information concerning RISC processors in general is available in C. May et al. Ed., *PowerPC Architecture: A Specification for a New Family of RISC Processors*, (Morgan Kaufamann, 1994 2d edition). Processors 101 are coupled to system memory 250 and various other components via system bus 113. Read only memory (ROM) 102 is coupled to the system bus 113 and may include a basic input/output system (BIOS), which controls certain basic functions of system 100. FIG. 1 further depicts an I/O adapter 107 and a network adapter 106 coupled to the system bus 113. I/O adapter 107 may be a small computer system interface (SCSI) adapter that communicates with a hard disk 103 and/or tape storage drive 105. I/O adapter 107, hard disk 103, and tape storage device 105 are collectively referred to herein as mass storage 104. A network adapter 106 interconnects bus 113 with an outside network enabling data processing system 100 to communicate with other such systems. Display monitor 136 is connected to system bus 113 by display adapter 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O busses for connecting peripheral devices such as hard disk controllers, network adapters, and graphics adapters include the Peripheral Components Interface (PCI) bus according to PCI Local Bus Specification Rev. 2.2 available from the PCI Special Interest Group, Hillsboro Oreg., and incorporated by reference herein. Additional input/output devices are shown as connected to system bus 113 via user interface adapter 108 and display adapter 112. A keyboard 109, mouse 110, and speaker 111 all interconnected to bus 113 via user interface adapter 108, which may include, for example, a SuperI/O chip integrating multiple device adapters into a single integrated circuit. For additional information concerning one such chip, the reader is referred to the PC87338/PC97338 ACPI 1.0 and PC98/99*Compliant SuperI/O* data sheet from National Semiconductor Corporation (November 1998) at www.national.com. Thus, as configured in FIG. 1, system 100 includes processing means in the form of processors 101, storage means including system memory 250 and mass storage 104, input means such as keyboard 109 and mouse 110, and output means including speaker 111 and display 136. In one embodiment a portion of system memory 250 and mass storage 104 collectively store an operating system such as the AIX® operating system from IBM Corporation to coordinate the functions of the various components shown in FIG. 1. Additional detail concerning the AIX operating system is available in *AIX Version* 4.3 *Technical Reference: Base Operating System and Extensions, Volumes* 1 *and* 2 (order numbers SC23-4159 and SC23-4160); *AIX Version* 4.3 *System User's Guide: Communications and Networks* (order number SC23-4122); and *AIX Version* 4.3 *System User's Guide: Operating System and Devices* (order number SC23-4121) from IBM Corporation at www.ibm.com and incorporated by reference herein.

Figure 2:
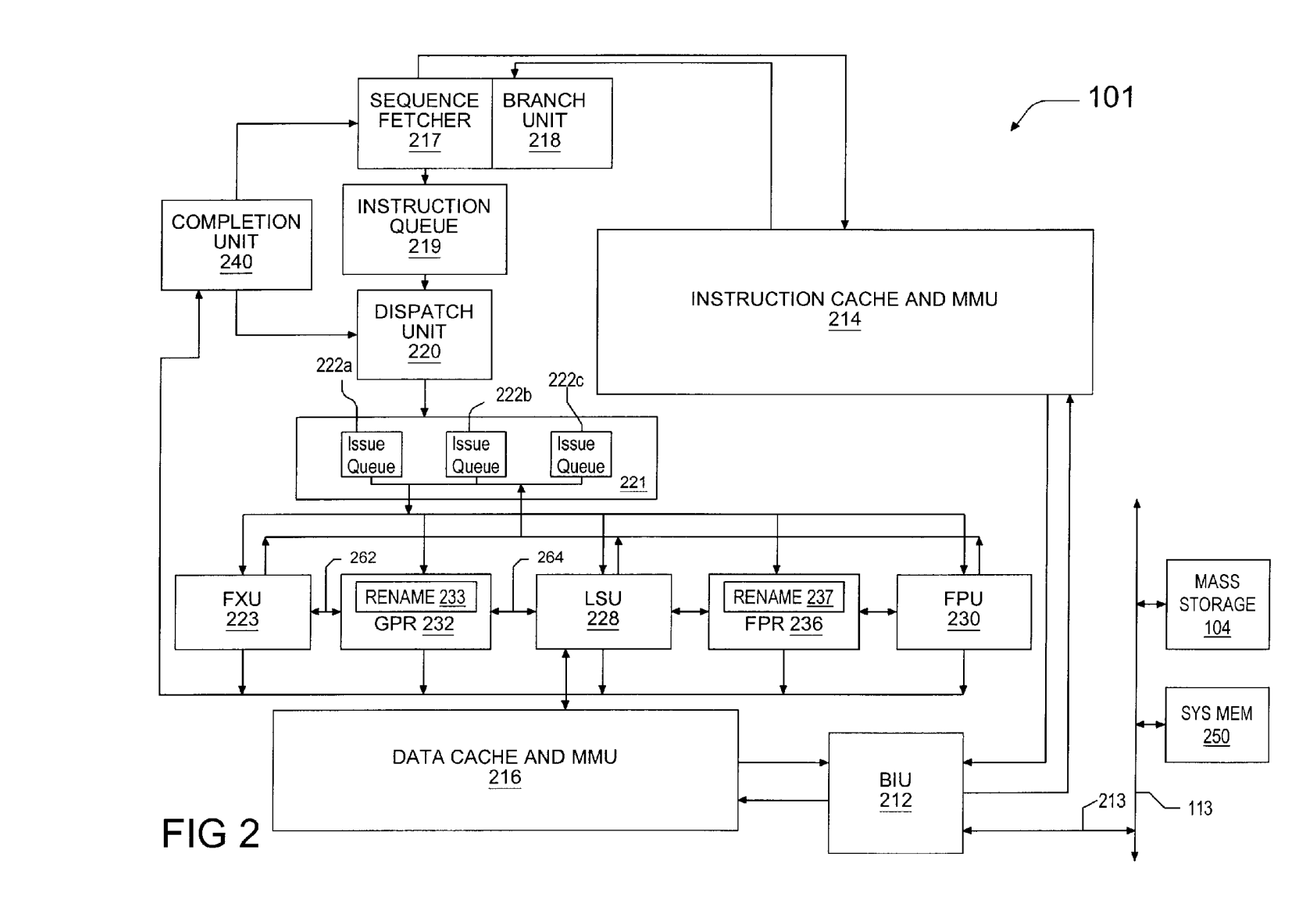
FIG. 2 is a simplified block diagram of a microprocessor suitable for use with the data processing system of FIG. 1.

Turning now to FIG. 2, a simplified block diagram of an embodiment of processor 101 suitable for use in system 100 is presented. In the depicted embodiment, processor 101 comprises an integrated circuit superscalar microprocessor fabricated on a monolithic semiconductor substrate. Processor 101 includes various execution units, registers, buffers, memories, and other functional units as discussed in greater detail below. As illustrated in FIG. 2, processor 101 is coupled to system bus 113 via bus interface unit (BIU) 212 and processor bus 213, which like system bus 113 includes address, data, and control buses. BIU 212 controls the transfer of information between processor 101 and other devices coupled to system bus 113, such as system memory 250 and mass storage 104. It will be appreciated that processor 101 may include other devices coupled to system bus 113 that are not necessary for an understanding of the following description and are accordingly omitted for the sake of simplicity.

BIU 212 is connected to instruction cache and memory management unit 214 and data cache and memory management unit 216 within processor 101. High-speed caches, such as those within instruction cache 214 and data cache 216, enable processor 101 to achieve relatively fast access times to a subset of data or instructions previously transferred from system memory 250, thus improving the speed of operation of data processing system 100. Data and instructions stored within data cache 216 and instruction cache 214, respectively, are identified and accessed by address tags, which each comprise a selected number of bits (typically the high-order bits) of the system memory physical address in which the data or instructions reside. Sequential fetch unit 217 retrieves instructions for execution from instruction cache 214 during each clock cycle. In one embodiment, if sequential fetch unit 217 retrieves a branch instruction from instruction cache 214 the branch instruction is forwarded to branch processing unit (BPU) 218 for execution. Sequential fetch unit 217 forwards non-branch instructions to an instruction queue 219, where the instructions are stored temporarily pending execution by other functional units of processor 101. A dispatch unit 220 is responsible for retrieving stored instructions from queue 219 and forwarding the instructions to an issue unit (ISU) 221. Dispatch unit 220 schedules dispatch of instructions to issue unit 221 based, in part, on instruction completion information received from a completion unit 240. The depicted embodiment of ISU 221 includes one or more issue queues 222a, 222b, 222c, etc. (collectively or generically referred to issues queue(s) 222). ISU 221 is responsible for maintaining fully loaded pipelines by issuing new instructions in each cycle to the execution units whenever possible. In one embodiment, instructions are issued from ISU 221 in program order although they may subsequently execute out-of-order.

In the depicted embodiment, the execution circuitry of processor 101, in addition to BPU 218, includes multiple functional units for executing sequential instructions, including fixed-point-unit (FXU) 223, load/store unit (LSU) 228, and floating-point unit (FPU) 230. Each of execution units 223, 228 and 230 typically executes one or more instructions of a particular type of sequential instruction during each processor cycle. For example, FXU 223 performs fixed-point mathematical and logical operations such as addition, subtraction, ANDing, ORing, and XORing, utilizing source operands received from specified general purpose registers (GPRs) 232. Following the execution of a fixed-point instruction, FXU 223 outputs the data results of the instruction to GPR buffers 232, which provide storage for the result received, on result bus 262. The FPU 230 typically performs single and double-precision floating-point arithmetic and logical operations, such as floating-point multiplication and division, on source operands received from floating-point registers (FPRs) 236. FPU 230 outputs data resulting from the execution of floating-point instructions to selected FPR buffers 236, which store the result data. As its name implies, LSU 228 typically executes floating-point and fixed-point load instructions, which load data from data cache 216, a lower level cache memory (not depicted), or system memory 250 into selected GPRs 232 or FPRs 236 or and floating-point and fixed-point store instructions, which store data from a selected one of GPRs 232 or FPRs 236 to data cache 216 and, ultimately, to system memory 250.

In the preferred embodiment, processor 101 employs both pipelining and out-of-order execution of instructions to further improve the performance of its superscalar architecture. Accordingly, instructions can be executed by FXU 223, LSU 228, and FPU 230 in an order that varies from the original program order of the instructions as long as data dependencies are observed. In addition, instructions are processed by each of FXU 223, LSU 228, and FPU 230 as a sequence of pipeline stages. In one embodiment, processor 101 includes five distinct pipeline stages, namely, fetch, decode/dispatch, execute, finish, and completion.

During the fetch stage, sequential fetch unit 217 retrieves one or more non-branch instructions from instruction cache 214 and stores the fetched instructions within instruction queue 219. In contrast, sequential fetch unit 217 forwards any branch instructions from the instruction stream to BPU 218 for execution. BPU 218 includes a branch prediction mechanism that includes, in one embodiment, a dynamic prediction mechanism such as a branch history table that enables BPU 218 to speculatively execute unresolved conditional branch instructions by predicting whether or not the branch will be taken.

During the decode/dispatch stage, dispatch unit 220 and ISU 221 decode and issue one or more instructions from issue queues 222 to execution units 223, 228, and 230, typically in program order. ISU 221 may allocate a rename buffer within GPR rename buffers 233 or FPR rename buffers 237 for each dispatched instruction's result data. In addition, instructions (or instructions identifiers or tags representative of the instructions) may be stored within the multiple-slot completion buffer (the completion table) of completion unit 240 as a means of tracking which instructions have completed in an out-of-order embodiment.

During the execute stage, execution units 223, 228, and 230 execute instructions issued from ISU 220 opportunistically as operands and execution resources for the indicated operations become available. In one embodiment, each of execution units 223, 228, and 230 are equipped with a reservation station that stores instructions dispatched to that execution unit until operands or execution resources become available. After execution of an instruction has terminated, execution units 223, 228, and 230 store data results, if any, within either GPRs or FPRs, depending upon the instruction type. In the depicted embodiment, execution units 223, 228, and 230 notify completion unit 240 which instructions have finished execution. Finally, instructions are completed in program order out of the completion table of completion unit 240. Instructions executed by FXU 223 and FPU 230 are completed by transferring data results of the instructions from GPR rename buffers 233 and FPR rename buffers 237 to GPRs 232 and FPRs 236, respectively.

Processor 101 supports out-of-order speculative instruction execution. Instructions may be speculative on a predicted branch direction or speculative beyond an instruction that may cause an interrupt condition. In the event of a branch misprediction or an interrupt, hardware automatically flushes undesired instructions from the pipelines and discards undesired results, presenting the effect of precise exceptions and sequentially executed instructions down the appropriate branch paths. Incorrect speculative results are selectively flushed from all units in one clock cycle, and instruction issue can resume the following clock cycle. Processor 101 may include multiple load units and a single store unit. However, it should be clear to one skilled in the art that processor 101 could comprise other configurations such as a single load/store unit, etc.

When an instruction is issued, the ISU 221 tags the instruction in such a manner that relative age between any two instructions can be easily determined. In one embodiment, sequential instructions are tagged with sequential integer (ITAGs). In addition to providing a mechanism for determining the issue order and relative age of issued instructions, ITAGs 106 provide a shorthand representation of their corresponding instructions. The ITAG value of each instruction is associated with queue entries and pipeline stages in which it resides. The use of ITAGs facilitates an instruction flush mechanism (in response to a processor-generated flush instruction) in which a magnitude comparison between the ITAG associated with the flush instruction and the ITAG associated with a particular queue entry or functional unit stage is performed and the entry invalidated if it is for an instruction which is as young or younger than (i.e., issued simultaneously or after) the flushed instruction. All remnants of the flushed instruction (and all subsequent instructions) are "flushed" from the machine and the fetch unit is redirected to the fetch starting at the address of the "flushed" instruction.

Turning now to FIGS. 4A, 4B, 5, and 6, simplified block diagrams and illustrative timing diagrams of the variable cycle reject feature of processor 101 according to one embodiment of the present invention are depicted. The present invention contemplates the optional delaying of the instruction reject determination. It will be appreciated by those skilled in microprocessor architecture having the benefit of this disclosure that the ability to delay the reject decision for a controllable and short (relative to the processor's instruction period) time provides flexibility to the architecture that can improve processor performance under circumstances when the first cycle in which all of the information and resources necessary to complete an instruction does not align with the instruction cycle. When such a condition occurs, the present invention permits a programmable delay in the determination and assertion of a reject signal thereby effectively relaxing the reject timing under predetermined circumstances such that it may not be necessary to reissue an instruction that would otherwise be rejected if it were required to be evaluated immediately upon reaching the pipeline finish stage.

Figure 4A:
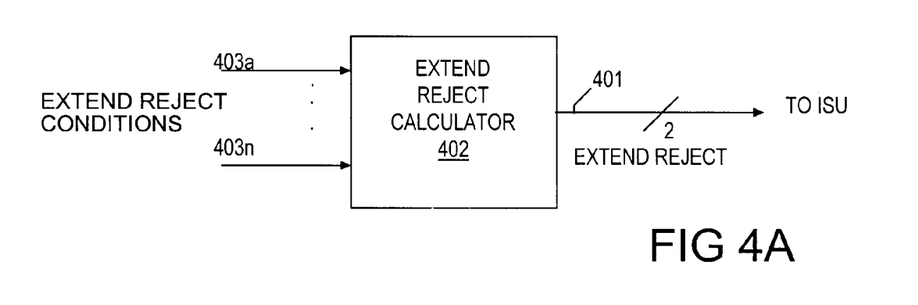
FIG. 4 is a simplified block diagram of a load/store unit suitable for use with the processor of FIG. 2.
Figure 4B:
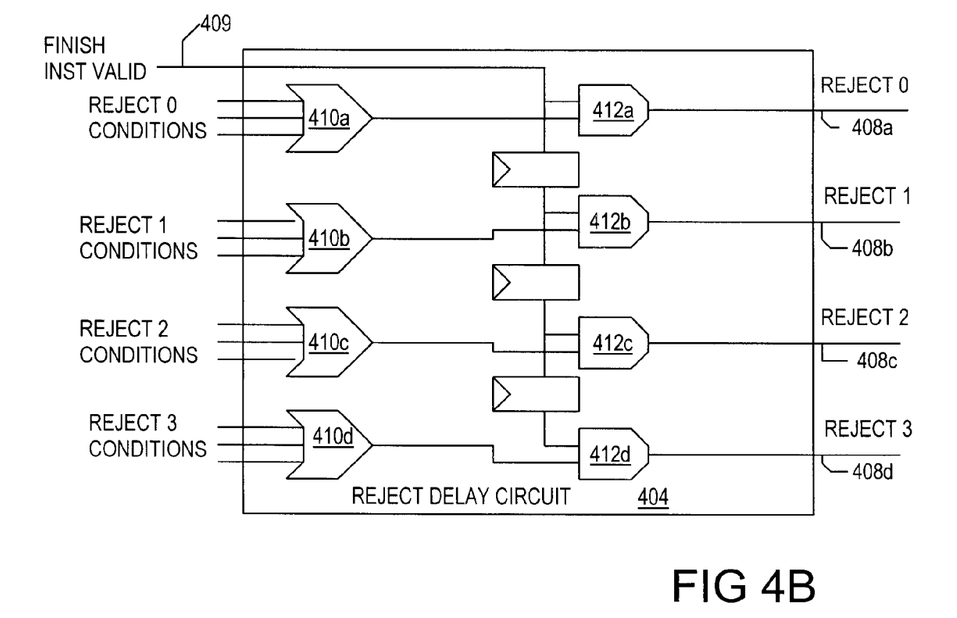
Figure 6:
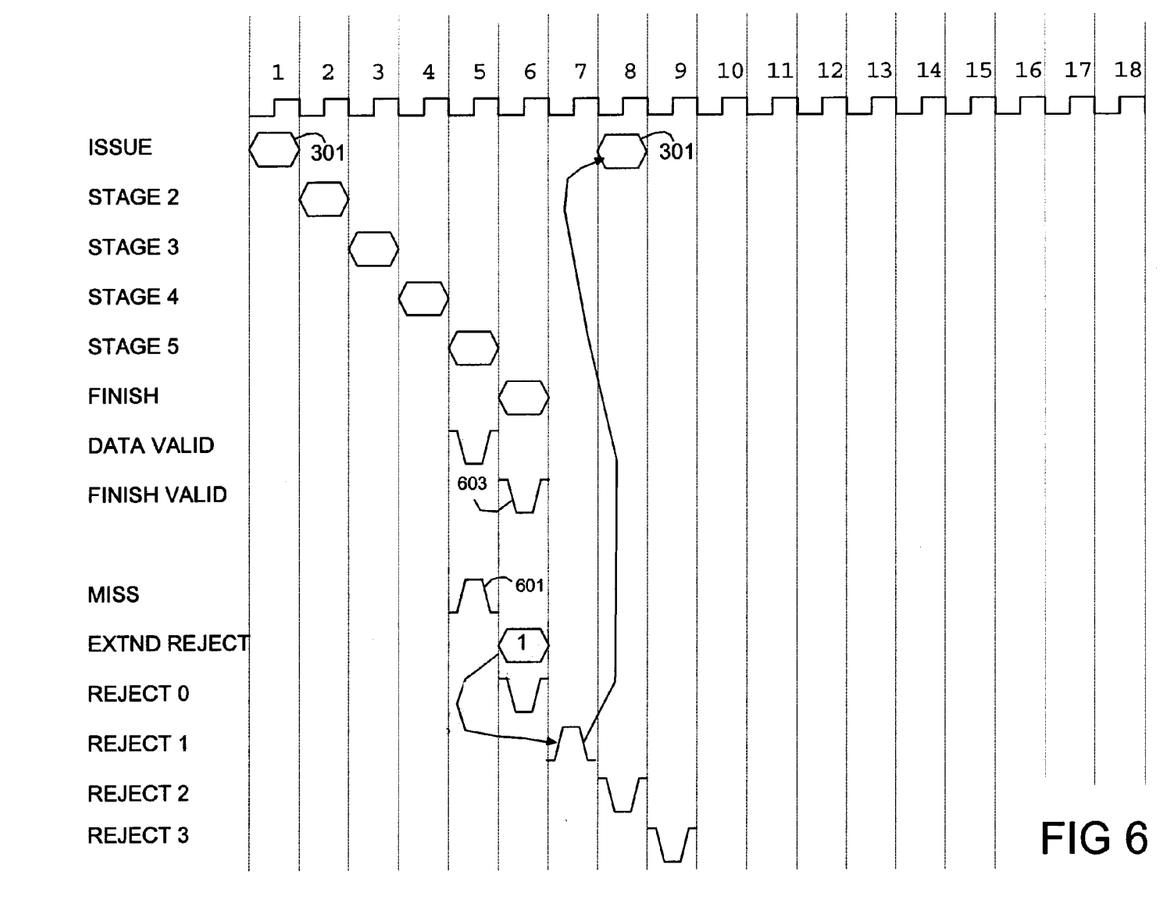
FIG. 6 is a timing diagram illustrating operation of a variable delay reject mechanism according to one embodiment of the present invention.

Referring to FIGS. 4A and 4B, simplified block diagrams of facilities in processor 101 according to the present invention emphasizing a delayed or extended reject feature is depicted. In the depicted embodiment, processor 101 includes an extend reject calculator 402 and a reject delay circuit 404. In one embodiment, extend reject calculator 402 receives various signals 403a through 403n (collectively or generically referred to herein as extend reject signal(s) 403). Extend reject signals 403 are indicative of conditions that affect the ability to accept or reject an instruction when the instruction arrives at the finish stage of the pipeline. Extend reject calculator 402 is adapted to evaluate extend reject signals 403 and determine the number of cycles by which the reject determination should be extended or delayed. As an example, one of the extend reject signals 403 may comprise an address translation miss signal indicative of whether address translation information necessary for a particular instruction will be available by the time the instruction reaches the finish stage. If the translation information will be available, the extend reject signal 403 that corresponds to this address miss condition is not asserted and (assuming no other extend reject signals 403 are asserted) extend reject calculator 402 generates a "0" on an extend reject bus that is routed to ISU 221 to indicate that the reject determination should be evaluated with zero cycles of delay (i.e., when the instruction arrives at the finish stage). If the address translation miss signal indicates that necessary address translation information is not available, extend reject calculator 402 will generate an extend reject value that is optimized for processor 101. If for example, nine cycles are required to retrieve the missing address translation information and the instruction cycle of processor 101 is six cycles, extend reject calculator 402 will generate an extend reject value of "3" that is routed to ISU 221. This signal will inform ISU 221 to retain the instruction for 3 cycles after the cycle reaches the finish stage and to evaluate the reject condition at that time. In another example, one of the extend reject signals 403 may indicate whether a particular resource, such as a result bus 264 (shown in FIG. 2) is available when an instruction reaches the pipeline finish stage. If the resource is needed but unavailable, the reject determination can be delayed in the hope that the resource will be available in the next cycle (or shortly thereafter). Turning momentarily to FIG. 6, a signal 601 occurs in a cycle previous to the finish cycle for instruction 301. This signal indicates that the result bus 264 is unavailable because, for example, data is being forwarded from an L2 cache of processor 101 in response to a previous load instruction that missed in the L1 cache. In response to signal 601, which is routed to extend reject calculator 402 as one of the extend reject signals 403, extend reject calculator 402 generates a delay value of 1 cycle. The finish valid signal 603 in the finish cycle (cycle 6) of instruction 301 indicates that the instruction would have been rejected in cycle 6 if the processor were forced to reject or accept the instruction in that cycle.

Returning to FIGS. 4A and 4B, extend reject bus 401 in one embodiment is a 2-bit bus capable of generating an extend reject value from 0 to 3. In this embodiment, the reject delay circuit 404 is adapted to issue 4 reject signals 408a, 408b, 408c, and 408d, (reject signal(s) 408), each delayed by one clock cycle from the other. The reject signals 408a through 408d are generated by the corresponding gates 412a through 412d as the logical AND of instruction finish valid signal 409, which indicates that a valid instruction is present in the finish stage of the execution pipeline, and the output of a corresponding OR gates 410a through 410d. The OR gate 410a corresponding to reject 0 signal 408a receives various reject conditions that require 0 delay (i.e., the reject determination can be made. when the instruction is in the finish stage). Similarly for the remaining signals 408b, 408c, and 408d, each is driven by a corresponding OR gate 410b, 410c, and 410d that receives various reject condition signals that require the corresponding extension of the reject determination. Reject conditions that would benefit from a 1 cycle delay, for example, comprise the inputs of OR gate 410b that determines the state of reject 1 signal 408b, while reject conditions that would benefit from a 2 cycle delay comprise the inputs of OR gate 410c that determines the state of reject 2 signal 408c and so forth.

Figure 5:
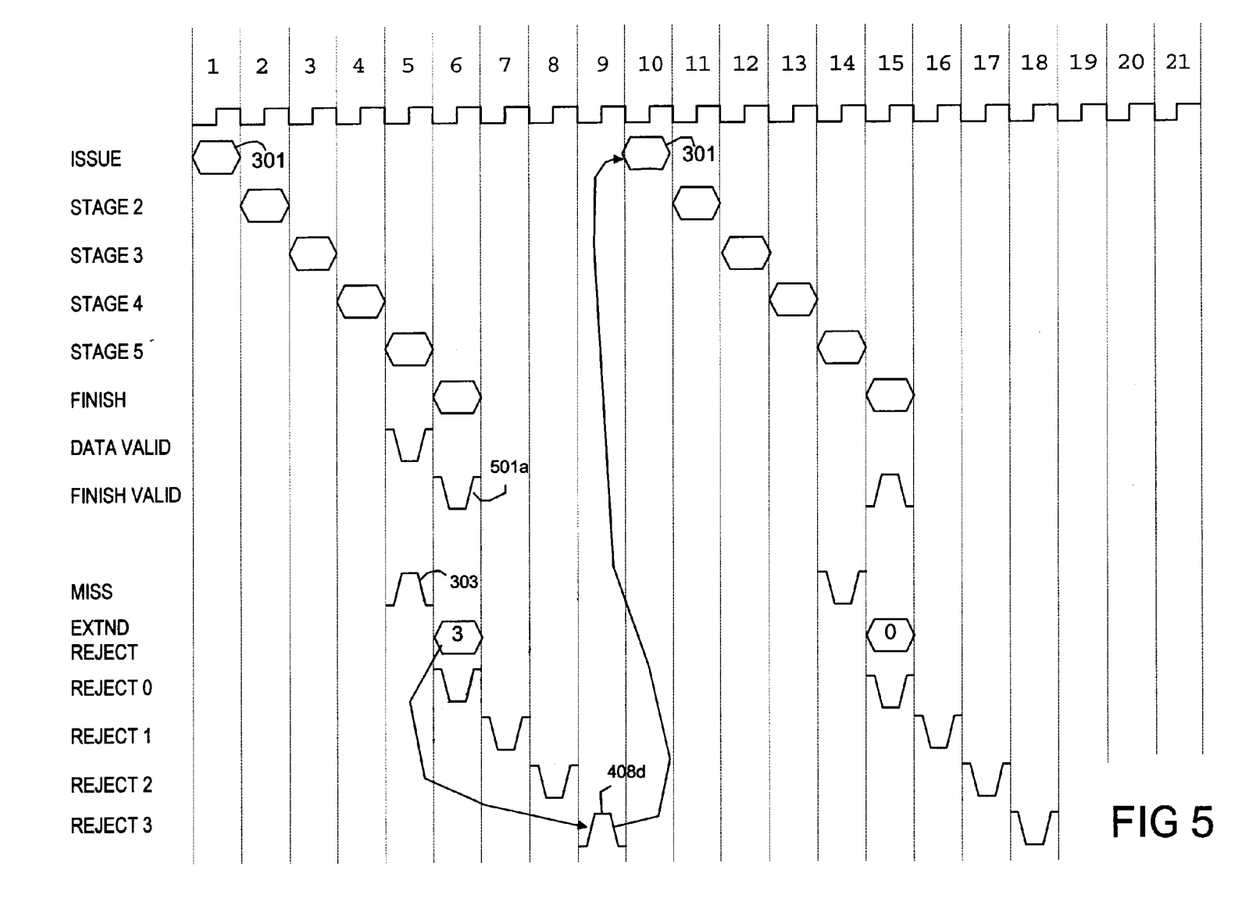
FIG. 5 is a timing diagram illustrating operation of a variable delay reject mechanism according to one embodiment of the present invention.

Turning to FIG. 5, a timing diagram illustrating operation of processor 101 according to the present invention is presented. In this illustration, instruction 301 is issued in clock cycle 1, propagates through the LSU pipeline and, arrives at the pipeline finish stage in cycle 6 (the finish cycle). The negated finish valid signal 501a indicates, that if evaluated in the finish cycle, instruction 301 would be rejected and reissued in cycle 7 in the manner described above in reference to FIG. 3. Processor 101 according to the present invention, however, delays the reject determination until a determination cycle, which occurs after the finish cycle by the number of cycles indicated by extend reject bus 401. Thus, the number of cycles between the issue cycle (cycle 1) and determination cycle is a function of the extend reject value. In the depicted example, the determination cycle (cycle 9) is located three cycles after the finish cycle in accordance with the state of information signals 403 received by extend reject calculator 402. At the end of the delay, the assertion of REJECT 3 signal 408d controls evaluation of the reject determination such that instruction 301 is ultimately rejected by ISU 221 in cycle 9 and reissued in cycle 10. When instruction 301 arrives at the pipeline finish stage for the second time in cycle 15, the necessary address translation information is available and instruction 301 is able to complete successfully. It will be appreciated that the 3 cycle delay in the example illustrated in FIG. 5 improved the overall performance of instruction 301 because the instruction was able to complete in 15 cycles rather than the 18 cycles it took to complete the instruction illustrated in FIG. 3. In other words, by adding a 3 cycle delay at the end of the first execution of instruction 301, processor 101 and LSU 228 are able to align the end of the next instruction cycle with the earliest cycle in which the necessary information and resources will be available to complete the instruction. Thus, the present invention offers the potential for improved performance by delaying, on a selectable basis, the cycle in which instructions are evaluated for reissue. Regardless of whether the instructions are able to successfully complete after the delayed period provided by the present invention, potential performance improvements may result by reducing the number of times any given instruction is required to be reissued.

It will be apparent to those skilled in the art having the benefit of this disclosure that the present invention contemplates improved performance by permitting a variable delay reject mechanism. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method of processing instructions with a microprocessor, comprising:

issuing an instruction in a first cycle to a pipelined execution unit;

receiving a set of extend reject signals and, responsive thereto, calculating an extend reject value;

determining whether to reject the instruction in a determination cycle, wherein the number of cycles between the first cycle and the determination cycle comprises the number of stages in the pipelined execution unit plus the number of cycles indicated by the extend reject value; and reissuing the instruction after the determination cycle if the instruction was rejected in the determination cycle.

2. The method of claim 1, wherein the extend reject value is conveyed via a 2-bit bus suitable for extending the determination cycle from 0 to 3 cycles after a finish cycle.

3. The method of claim 1, wherein the extend reject signals are indicative of whether information and resources necessary to finish the instruction are available.

4. The method of claim 3, further comprising retaining the instruction in an issue unit until the determination cycle.

5. The method of claim 1, wherein the set of extend reject signals includes an address translation signal indicative of whether address translation information necessary to retrieve data from a data cache is available.

6. A microprocessor, comprising:

an issue unit suitable for issuing an instruction to a pipelined execution unit in a first cycle; and an extend reject calculator configured to receive a set of extend reject signals and to generate an extend reject value based upon the set of extend reject signals;

wherein the processor makes a reject determination with respect to the instruction in a determination cycle, wherein the number of cycles between the first cycle and the determination cycle comprises the number of stages in the pipelined execution unit plus the number of cycles indicated by the extend reject value and wherein the issue unit is further configured to reissue the instruction in the cycle following the determination cycle.

7. The processor of claim 6, wherein the set of extend reject signals includes an address translation signal indicative of whether address translation information necessary to retrieve data from a data cache is available.

8. The processor of claim 6, wherein an issue unit of the processor is configured to receive the extend reject value and adapted to retain the corresponding instruction for the number of cycles indicated by the extend reject value following a finish cycle of the instruction.

9. The processor of claim 6, wherein the instruction is stalled in the finish stage for the number of cycles indicated by the extend reject value.

10. The processor of claim 6, wherein the extend reject value is conveyed via a 2-bit bus suitable for delaying the determination cycle from 0 to 3 cycles after a finish cycle.

11. A data processing system comprising:

at least one processor connected to a system bus;

system memory connected to the system bus;

input means connected to the system bus; and display means connected to the system bus;

wherein the processor includes an issue unit suitable for issuing an instruction to a pipelined execution unit in a first cycle and an extend reject calculator configured to receive a set of extend reject signals and to generate an extend reject value based upon the set of extend reject signals, wherein the processor makes a reject determination with respect to the instruction in a determination cycle, wherein the number of cycles between the first cycle and the determination cycle e comprises the number of stages in the pipelined execution unit plus the number of cycles indicated by the extend reject value and wherein the issue unit is configured to reissue the instruction in the cycle following the determination cycle.

12. The processor of claim 11, wherein the extend reject value is conveyed via a 2-bit bus suitable for delaying the determination cycle from 0 to 3 cycles after a finish cycle.

13. The processor of claim 11, wherein an issue unit of the processor is configured to receive the extend reject value and adapted to retain the corresponding instruction for the number of cycles indicated by the extend reject value following a finish cycle of the instruction.

14. The processor of claim 11, wherein the instruction is stalled in the finish stage for the number of cycles indicated by the extend reject value.

15. The processor of claim 11, wherein the set of extend reject signals includes an address translation signal indicative of whether address translation information necessary to retrieve data from a data cache is available.

* * * * *